US006292676B1

(12) United States Patent
Ozaki et al.

(10) Patent No.: US 6,292,676 B1
(45) Date of Patent: Sep. 18, 2001

(54) DISPLAY METHOD AND SYSTEM FOR RADIO RECEIVER

(75) Inventors: Ichiro Ozaki; Makoto Ota, both of Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/216,861

(22) Filed: Dec. 21, 1998

(30) Foreign Application Priority Data

Dec. 22, 1997 (JP) .................................................. 9-352865

(51) Int. Cl.[7] ...................................................... H04B 1/38

(52) U.S. Cl. ......................... 455/566; 455/407; 455/38.3

(58) Field of Search ............................. 455/154.1, 154.2, 455/159.1, 550, 566, 575, 407, 574, 343, 226.4, 38.3, 414, 404; 345/207, 214, 48, 84; 340/825.49, 7.58

(56) References Cited

U.S. PATENT DOCUMENTS

| | | | | |
|---|---|---|---|---|
| 5,128,594 | * | 7/1992 | Watanabe et al. | 315/294 |
| 5,212,810 | * | 5/1993 | Maeda et al. | 455/528 |
| 5,363,223 | * | 11/1994 | Beesley | 349/72 |
| 5,486,843 | * | 1/1996 | Otting et al. | 345/35 |
| 5,548,832 | * | 8/1996 | Karam | 455/226.4 |
| 5,627,882 | * | 5/1997 | Chien et al. | 379/61 |
| 5,684,861 | * | 11/1997 | Lewis et al. | 455/405 |
| 5,835,581 | * | 11/1998 | Wu et al. | 379/142 |
| 6,091,827 | * | 7/2000 | Tanaka | 381/306 |
| 6,094,565 | * | 7/2000 | Alberth et al. | 455/90 |
| 6,137,481 | * | 10/2000 | Phillips | 345/173 |
| 6,138,039 | * | 10/2000 | Sudo et al. | 455/566 |

FOREIGN PATENT DOCUMENTS 5-61426 3/1993 (JP) .

* cited by examiner

*Primary Examiner*—Dwayne Bost
*Assistant Examiner*—Joy K. Contee
(74) *Attorney, Agent, or Firm*—Young & Thompson

(57) ABSTRACT

A radio selective call reception section 1 receives radio selective information and outputs the received information 8, a user operating section 5 receives an operation of a user and outputs operating information 9, a control section 2 analyzes the received information 8 and the operating information 9 and outputs display information 11 and information 12 on whether an operation has been conducted, a display section 4 displays a display data 14, a display controlling section 3 controls the display section 4, an operating information storing section 6 statistically stores the user's operating information 9 as an operation frequency and outputs information 10 on a period of time when a display is continuously conducted, and a section 7 senses the information 10 on a period of time when a display is continuously conducted and the information 12 on whether an operation of a user has been conducted, and outputs a display and putting-out light signal 13 to the display controlling section 3.

24 Claims, 3 Drawing Sheets

FIG.3

(PRESENT) 21

| OPERATING PERIOD OF TIME | OPERATING TIMES | OPERATION FREQUENCY | DISPLAY DETERMINATION |
|---|---|---|---|
| 0:00 ~ 1:00 | 50 | 6 | OFF |
| 1:00 ~ 2:00 | 13 | 22 | OFF |
| 2:00 ~ 3:00 | 5 | 24 | OFF |
| ... | ... | ... | ... |
| 15:00 ~ 16:00 | 26 | 15 | OFF |
| 16:00 ~ 17:00 | 10 | 23 | OFF |
| 17:00 ~ 18:00 | 256 | 1 | ON |
| ... | ... | ... | ... |
| 21:00 ~ 22:00 | 98 | 2 | ON |
| 22:00 ~ 23:00 | 81 | 3 | ON |
| 23:00 ~ 24:00 | 66 | 4 | OFF |

(USER'S OPERATING INFORMATIO) 22

CURRENT OPERATION TIME 23:00~24:00 USER'S OPERATING TIMES 31

(AFTER OPERATION) 23

| OPERATING PERIOD OF TIME | OPERATING TIMES | OPERATION FREQUENCY | DISPLAY DETERMINATION |
|---|---|---|---|
| 0:00 ~ 1:00 | 50 | 6 | OFF |
| 1:00 ~ 2:00 | 13 | 22 | OFF |
| 2:00 ~ 3:00 | 5 | 24 | OFF |
| ... | ... | ... | ... |
| 15:00 ~ 16:00 | 26 | 15 | OFF |
| 16:00 ~ 17:00 | 10 | 23 | OFF |
| 17:00 ~18:00 | 256 | 1 | ON |
| ... | ... | ... | ... |
| 21:00 ~ 22:00 | 98 | 2 | ON |
| 22:00 ~ 23:00 | 81 | 4 | OFF |
| 23:00 ~ 24:00 | 97 | 3 | ON |

DISPLAY METHOD AND SYSTEM FOR RADIO RECEIVER

BACKGROUND OF THE INVENTION

The present invention relates to a display method and system of a radio receiver, and more particularly, to a display method and system of a radio receiver having a function for determining a display or putting-out the light of a display section by means of an operation of a user.

Generally, in a display section of a radio receiver with a display function, a more current is consumed during a display compared with during putting-out of the light, and in case of maintaining the display during a period when a user does not conduct an operation at all, a current is consumed wastefully, which becomes to make consumption of a battery fast.

Also, there is other display section of a radio receiver having a function in which a display is conducted only when a user conducts an operation, and a light is turned off other than a period when the display is being conducted. However, since the user has to conduct an operation every time he looks at the display, there is a task that operability and an operating section are made to be complicated.

As one example of such control of a display section, a "display controlling system for a display" disclosed in JP-A-61426/1993 is known.

However, in this JP-A-61426/1993, a technology is described, in which in case that the contents of a display being displayed on a display screen of a display device do not change for a constant period of time, brightness of the display screen is automatically lowered and a driving current for a display section is reduced, and the brightness of the display screen is restored when a change occurs in the contents being displayed on the display screen.

The above-mentioned conventional display system for the radio receiver has a defect that, during a period of time when a change does not occur in the contents being displayed on the display screen, an amount of consumption of a battery increases due to the driving current of the display section, and a lifetime of the battery becomes to be shorten.

Also, in a continuous display or a selective display only during operation or notification by a user, there is a defect that an operating section becomes to be complicated and operability gets worse.

SUMMARY OF THE INVENTION

Therefore, the objective of the present invention is to solve the above-described tasks.

Also, the objective of the present invention is to provide a display method and system for a radio receiver in which display situation is maintained only during a period of time required by a user, and the increase of a lifetime of a battery and good operability are provided.

The above-described objective of the present invention is achieved by a display method for a radio receiver, including steps of: based on a call reception signal and operating information from a user, statistically processing and storing an operating frequency of this user; utilizing this statistically processed information; and conducting a display and putting-out of a light of a display section.

Also, the above-described objective of the present invention is achieved by a display system for a radio receiver, including: a radio receiving section for receiving a call reception signal and outputting received information; an operating section for outputting operating information subject to an operation of a user; a control section for analyzing the above-described received information and the above-described operating information and outputting display information and information on whether an operation has been conducted; an operating information storing section for statistically processing operating times of the above-described user based on the above-described operating information and the above-described display information, storing the operating times, and outputting display time information; a section for determining a display and putting-out of a light, which outputs a display and putting-out light signal for controlling the display and putting-out of the light based on the above-described display time information and the above-described information on whether an operation has been conducted; a display controlling section for conducting output control of the above-described display information by means of this display and putting-out light signal, and outputting a display data; and a display section for displaying this display data.

Also, the display system for the radio receiver can be constructed so as to include an alarm device and a vibrator.

The above-described operating information storing section can be constructed so as to output an alarm signal concurrently with an output of the above-described display time information, and the alarm signal is notified by means of the alarm device.

Also, the above-described operating information storing section can be constructed so as to output a notification signal concurrently with an output of the above-described display time information, and the notification signal is notified by means of the vibrator.

Moreover, the above-described control section, the above-described operating information storing section, the above-described section for determining a display and putting-out of a light, and the above-described display controlling section can be integrally structured by means of integration.

Also, the above-described objective of the present invention is achieved by a display method for a radio receiver, including steps of: receiving a call reception signal and outputting received information; outputting operating information subject to an operation of a user; analyzing the above-described received information and the above-described operating information and outputting display information and information on whether an operation has been conducted; statistically processing operating times of the above-described user based on the above-described operating information and the above-described display information, storing the operating times, and outputting display time information; outputting a display and putting-out light signal for controlling a display and putting-out of a light based on the above-described display time information and the above-described information on whether an operation has been conducted; conducting output control of the above-described display information by means of this display and putting-out light signal, and outputting a display data; and displaying this display data.

The above-described step of statistically processing operating times of the above-described user can include a step of outputting an alarm signal concurrently with an output of the above-described display time information, and the alarm signal is notified by means of an alarm device.

Also, the above-described step of statistically processing operating times of the above-described user can include a step of outputting a notification signal concurrently with an output of the above-described display time information, and the notification signal is notified by means of a vibrator.

In accordance with the display method or system for the radio receiver of the present invention as constructed above, since a period of time when a frequency of user's use is high is calculated from the operating information, and control for driving the display section is conducted for a restricted period of time, and also, since it is possible to put out the light during a period of time when a frequency of user's use is low, an advantage that an amount of consumption of a current for driving the display section can be suppressed to a minimum is effected.

Also, in accordance with the present invention, since display control is automatically conducted in accordance with a frequency of use, an advantage that an operating section can be simplified and operability can be improved is effected.

BRIEF DESCRIPTION OF THE DRAWINGS

This and other objects, features and advantages of the present invention will become more apparent upon a reading of the following detailed description and drawings, in which:

FIG. 3 is a view for explaining screen construction of an operating information storing section in FIG. 1.

DESCRIPTION OF THE EMBODIMENTS

Embodiments of the present invention will be explained by referring to drawings.

Figure 1:
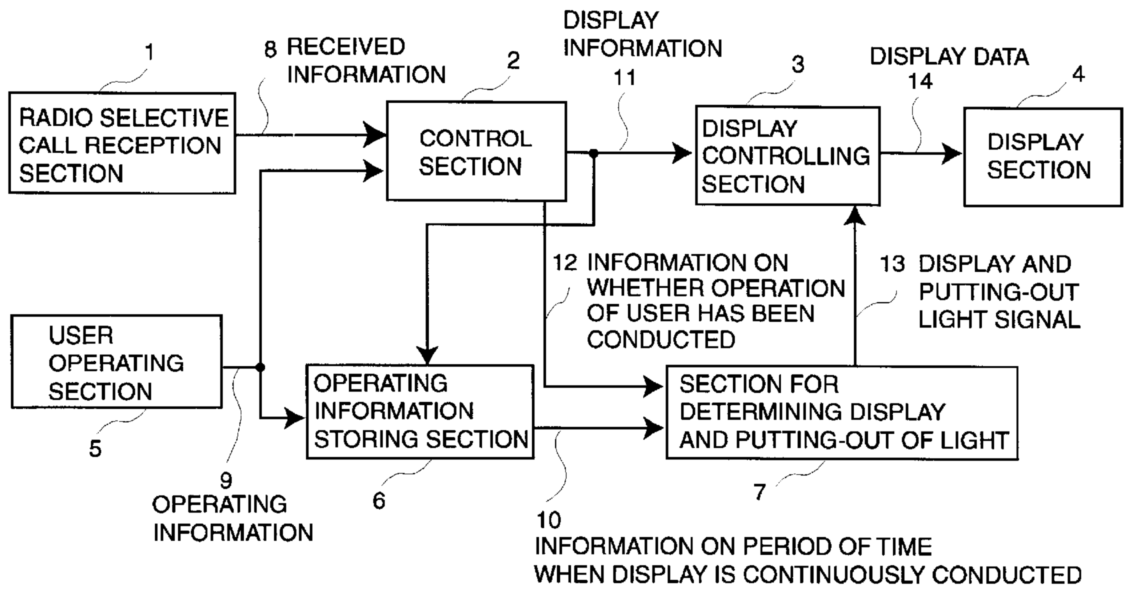
FIG. 1 is a block diagram showing one embodiment of a display system for a radio receiver of the present invention.

FIG. 1 is a block diagram showing one embodiment of a display system for a radio receiver of the present invention.

The display system for a radio receiver in the embodiment shown in FIG. 1 is constructed of a radio selective call reception section 1 for receiving radio selective information (not shown), a user operating section 5 for receiving an operation of a user, a control section 2 for analyzing the received information 8 output from the radio selective call reception section 1 and the operating information 9 output from the user operating section 5, and for outputting display information 11, a display section 4 for displaying a resultant display data 14, a display controlling section 3 for controlling the display section 4, an operating information storing section 6 for statistically storing user's operating information 9 as an operation frequency and outputting information 10 on a period of time when a display is continuously conducted, a section 7 for determining a display and putting-out of a light, which receives the information 10 on a period of time when a display is continuously conducted, and receives information 12 from the control section 2 on whether an operation of a user has been conducted, determines a display and putting-out of a light of the display section 4, and outputs a display and putting-out light signal 13 to the display controlling section 3.

Figure 2:
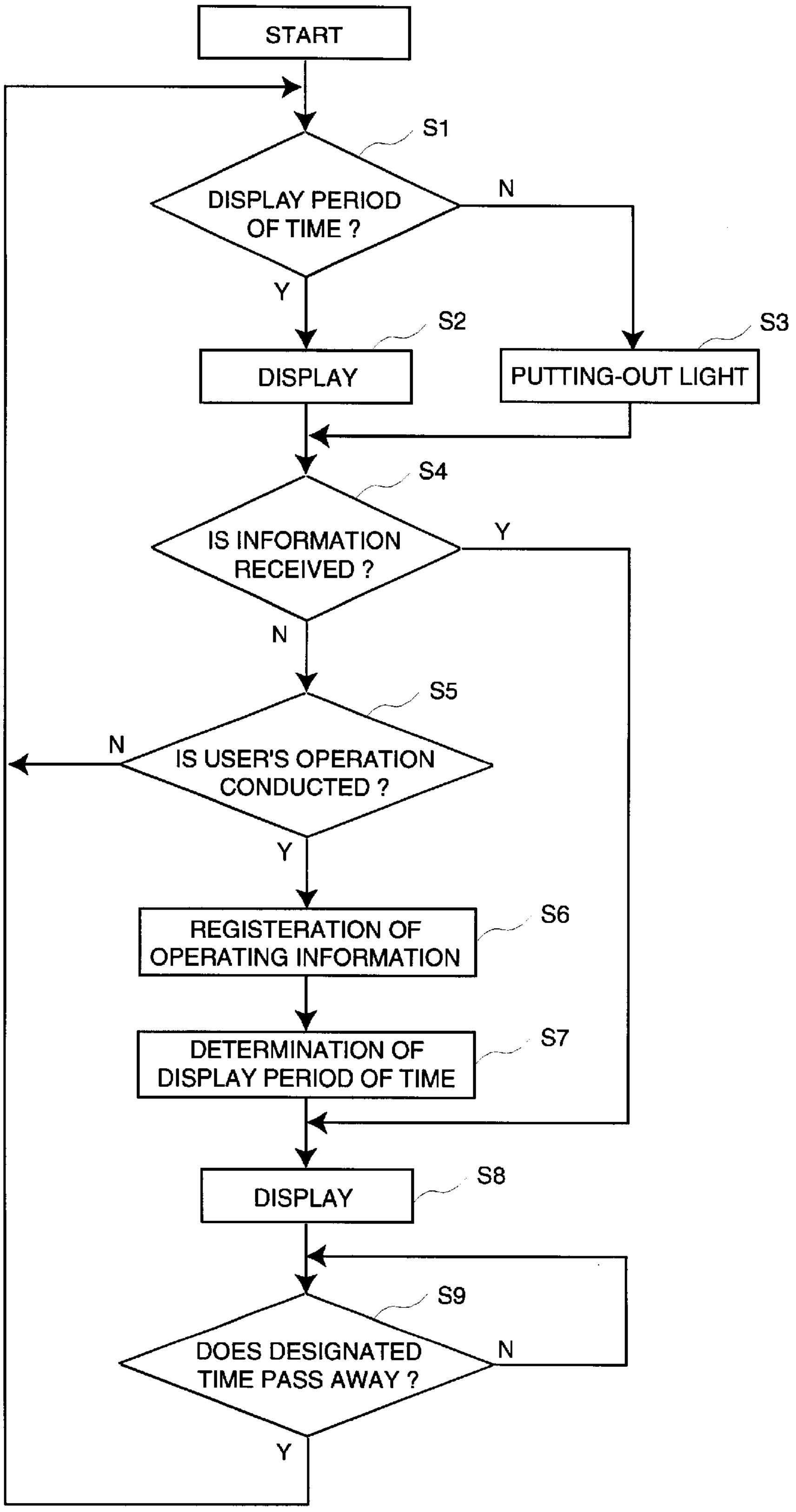
FIG. 2 is a flowchart showing operation of the embodiment of FIG. 1.

FIG. 2 is a flowchart showing operation of the embodiment of FIG. 1.

Next, operation of this embodiment will be explained in detail by referring to FIG. 1 and FIG. 2.

In case that, under condition that a light of a screen of the display section 4 is turned off, the current time coincides with display designated time (STEP 1: S1), the display section 4 is driven and display processing is conducted (STEP 2: S2).

Also, in case that the current time does not coincide with the display designated time at STEP 1, determination of a lapse of the designated time is conducted, and processing for putting out a light is conducted when designated time passes away (STEP 3: S3).

After the determination processing of the above-mentioned period of time when a display is designated, determination whether or not information is received is conducted (STEP 4: S4). If the reception is conducted, display processing is conducted (STEP8: S8), and if the reception is not conducted, the operation moves to determination whether or not user's operation is conducted (STEP 5: S5). In case that the user conducts some operation to the radio selective call reception section 1, concurrently with conducting screen display processing, the operating information 9 with respect to the operation is registered in the operating information storing section 6 (STEP6: S6).

Based on statistical information of the operating information 9 with respect to the user obtained up to the present and the operating information 9 obtained at the current time, a display period of time when a frequency of use for the radio selective call reception section 1 is high is determined (STEP 7: S7), the above-mentioned display designated time is set, and display processing is conducted (STEP 8: S8). At the next STEP 9 (S9), a lapse of the display designated time is monitored, and after designated time passes away, the operation returns to STEP 1 (S1).

FIG. 3 is a view for explaining screen construction of the operating information storing section in FIG. 1.

In the operating information storing section 6, operating times up to the present for the radio selective call reception section 1, which are partitioned by a unit of time and are possessed by a user, are statistically stored, and an operation frequency time by time obtained from statistics of the stored operating times, and determination of a display and putting-out of a light based on the operation frequency are set. It is assumed that an operating period of time, operating times, an operation frequency and display determination in the operating information storing section 6 are presently set as shown in a screen 21 of the operating information storing section. Thereafter, if the user conducts an operation and the operating information 9 as shown in a user's operating information screen 22 is obtained from the user operating section 5, in the operating information storing section 6, operating times information is processed to determine a operation frequency based on the display information 11 up to the present and the operating information 9, and after the operation, display determination and a set of an operating period of time as shown in an operating information screen 23 are conducted.

The information 10 on a period of time when a display is continuously conducted, which is set at and output from the operating information storing section 6 is compared with real time at the section 7 for determining a display and putting-out of a light, and in case that the information 10 coincides with the real time, the information 10 is displayed at the display section 4, and after designated time passes away, the display and putting-out light signal 13 is output to the display controlling section 3 and processing for putting out a light is conducted.

In this manner, by having the operating information storing section 6 for storing display time, it is possible to statistically process and store the operation frequency of the user within a constant period of time, and also, by having the section 7 for determining a display and putting-out of a light for controlling the display and putting-out of the light of the display section 4 utilizing the statistically processed information, since it is possible to display a period of time when the user conducts an operation frequently and set a period of time when an operation is not conducted at all as a period of time for putting out a light, it is possible to keep the display section 4 being display condition for only a period of time when the user needs the display.

The display of the display section 4 determines a display period of time as a time unit, and a display and putting-out of a light are set based on an operation frequency. In this case, since a minimum display period of time is consisted of a time unit, consumption of a current in a continuous display becomes to increase. Accordingly, by setting a unit of the display period of time as a unit of minute and making the operation frequency for determining a display to be able to be controlled from a user side, it becomes to be possible to suppress excess consumption of a current.

In addition, it is also possible to make a function for controlling a display period of time cooperate with a reception notifying function. For example, in case that reception of a message occurs during a period of time when a frequency of use by a user is low, it is possible to prohibit notification by means of notification means such as a speaker and exchange it for notification means such as a vibrator, and in case that reception of a message occurs during a period of time when a frequency of use by a user is high, it is possible to conduct notification by means of a speaker with large sound volume. Accordingly, an alarm signal for actuating the speaker or a notification signal for driving the vibrator becomes to be output from the operating information storing section 6.

Here, the control section 2, the operating information storing section 6, the section 7 for determining a display and putting-out of a light, and the display controlling section 3 can be integrated as integral construction using a gate array or an LSI.

The entire disclosure of Japanese Patent Application No. 9-352865 filed on Dec. 22, 1997 including specification, claims, drawing and summary are incorporated herein by reference in its entirety.

What is claimed is:

1. A method for controlling illumination of a display device of a radio receiver, comprising the steps of:

monitoring receipt of transmissions by the radio receiver and a users operation of the radio receiver;

determining and storing statistical information related to the receipt of transmission and the users operation; and controlling the illumination of the display device based on the statistical information.

2. The method of claim 1, wherein the statistical information related to the receipt of transmission and the users operation is divided into a plurality of time periods during a day.

3. The method of claim 2, wherein the time periods comprise a plurality of hour-long periods.

4. The method of claim 3, wherein each of the plurality of time periods is designated as being one in which the display is automatically illuminated or one in which the display is not automatically illuminated.

5. The method of claim 2, wherein each of the plurality of time periods is designated as being one in which the display is automatically illuminated or one in which the display is not automatically illuminated.

6. The method of claim 5, wherein the statistical information includes cumulative operating time of the radio receiver during each said time period during a day.

7. The method of claim 6, wherein the statistical information further includes information related to frequency of operation of the radio receiver by the user during each said time period during a day.

8. The method of claim 2, wherein the statistical information includes cumulative operating time of the radio receiver during each said time period during a day.

9. The method of claim 8, wherein the statistical information further includes information related to frequency of operation of the radio receiver by the user during each said time period during a day.

10. A method for controlling illumination of a display device of a radio receiver, comprising the steps of:

based on statistical use information, determining whether a current time period is one in which a user is likely to use the radio receiver; and if the current time period is one in which use by the user is statistically likely, illuminating the display device.

11. The method of claim 10, comprising the further step of illuminating the display device when a message is received by the radio receiver or when the user operates the radio receiver.

12. An illumination control system for a display of a radio receiver, comprising:

a radio receiver;

a user interface;

a controller having as inputs received information from the radio receiver and operation information from the user interface, the controller producing as outputs display information and operator use information;

a data storage device having as inputs the operation information from the user interface and the operator use information from the controller, the data storage device generating and storing statistical information regarding use of the radio receiver, the data storage device producing as an output an indicator of when the display should be illuminated based on statistical use; and an illumination controller receiving as an input the output of the data storage device and an output of the controller indicating when an operation has been performed, the illumination controller providing as an output a signal controlling illumination of the display.

13. The illumination control system of claim 12, wherein the statistical information regarding use of the radio receiver is divided into information pertaining to each of a plurality of time periods during a day.

14. The method of claim 13, wherein the time periods comprise a plurality of hour-long periods.

15. The method of claim 14, wherein each of the plurality of time periods is designated as being one in which the display is automatically illuminated or one in which the display is not automatically illuminated.

16. The method of claim 13, wherein each of the plurality of time periods is designated as being one in which the display is automatically illuminated or one in which the display is not automatically illuminated.

17. The method of claim 16, wherein the statistical information includes cumulative operating time of the radio receiver during each said time period during a day.

18. The method of claim 17, wherein the statistical information further includes information related to frequency of operation of the radio receiver by the user during each said time period during a day.

19. The method of claim 13, wherein the statistical information includes cumulative operating time of the radio receiver during each said time period during a day.

20. The method of claim 19, wherein the statistical information further includes information related to frequency of operation of the radio receiver by the user during each said time period during a day.

21. A display system for a radio receiver according to claim 12, further comprising an alarm device and a vibrator.

22. An illumination control system for a radio receiver according to claim 21, wherein said data storage device outputs an alarm signal concurrently with output of said display illumination indicator, and said alarm signal is notified by means of said alarm device.

23. An illumination control system for a radio receiver according to claim 21, wherein said data storage device outputs a notification signal concurrently with an output of said display illumination indicator, and said notification signal is notified by means of said vibration.

24. An illumination control system for a radio receiver according to claim 21, wherein said controller, said data storage device, said illumination controller are integrally structured by means of integration.

* * * * *